Nov. 25, 1924. 1,517,138
F. WIKE
FLEXIBLE ELASTIC LINK FOR ANTISKID CHAINS
Filed July 21, 1922
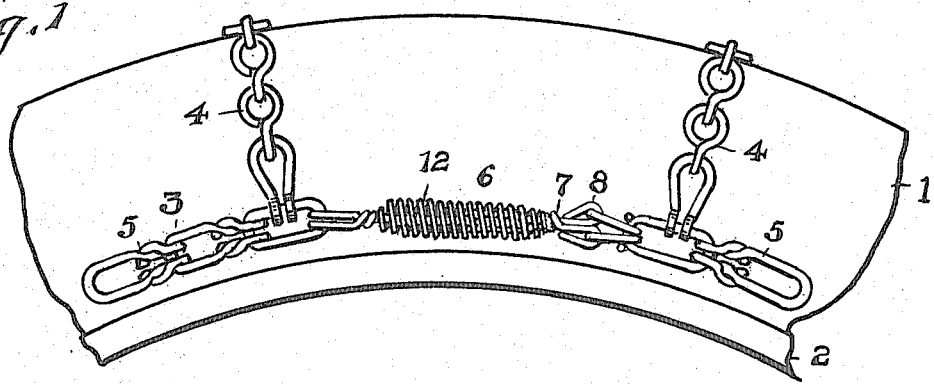
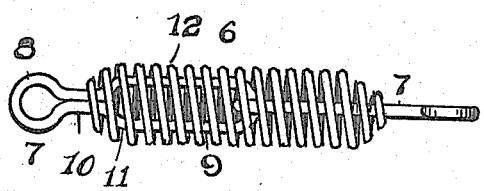
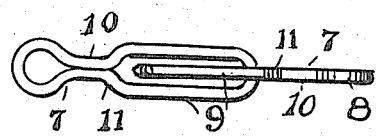
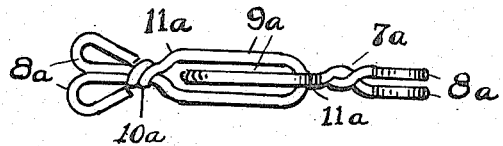
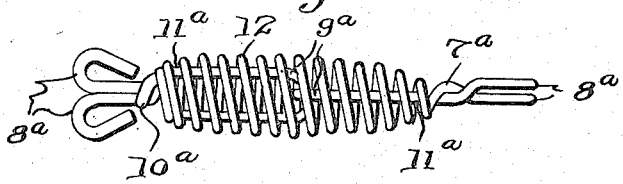
WITNESS
R. F. Dilworth
INVENTOR.
Fred Wike
BY F. N. Barber
ATTORNEY.

Patented Nov. 25, 1924.

1,517,138

UNITED STATES PATENT OFFICE.

FRED WIKE, OF MERCER, PENNSYLVANIA.

FLEXIBLE ELASTIC LINK FOR ANTISKID CHAINS.

Application filed July 21, 1922. Serial No. 576,553.

*To all whom it may concern:*

Be it known that I, FRED WIKE, a citizen of the United States, residing at Mercer, in the county of Mercer and State of Pennsylvania, have invented new and useful Improvements in Flexible Elastic Links for Antiskid Chains, of which the following is a specification.

My invention relates to side chains of antiskid chains for automobile tires.

The principal object of this invention is to provide antiskid chains having flexible elastic links which replace some at least of the stiff inelastic links now commonly used in the side members of antiskid chains.

Referring to the accompanying drawing, Fig. 1 is a fragmentary view showing in side elevation a portion of a tire with my improvements applied thereto; Fig. 2, a side elevation of one of my improved links somewhat enlarged; Fig. 3, a side elevation of the link of Fig. 2 with the coiled spring omitted; Fig. 4, a side elevation of my link with the coiled spring left off; and Fig. 5, a side elevation of the two endless members of Fig. 4 provided with the spring 12.

On the drawing, 1 designates a tire of the ordinary inflatable type, and 2 is the rim therefor. The antiskid chain is of the common type having an annular side member on each side of the tire, the annular members being connected together by cross-chains. I have shown one side member 3 of an antiskid chain with two cross-chains 4. The side members may be made up principally of the usual links 5, between some of which my improved link 6 may be connected.

In Figs. 1, 2 and 3, my link contains duplicate flexible members 7 composed of wire and having relative movement longitudinally. Preferably each member 7 comprises a single piece of wire having its ends welded together. Each member is bent so as to have the eye 8 at one end and the elongated loop 9 at the other end, the eye and loop being joined by the neck 10 composed of the two sides of the member being contiguous for a short distance, so that a shoulder 11 is formed at the junction of the neck with the loop. Before two companion members 7 are both welded as described, they are interlooped or interlinked so that each loop may have longitudinal play or movement in the other, but cannot become separated. A coiled spring 12 surrounds the loops 9 of the link and has its ends contracted so as to fit the neck 10 close to the shoulders 11 which serve as stops for the said contracted ends of the spring. The eyes 8 of my link are connected to other links, as 5, of the side member 3.

In Fig. 4, I show a modified link composed of the two members each composed of a single doubled piece of wire bent and assembled to form the interlinked elongated loops 9ª, the necks 10ª being formed by twisting the two ends of the wires around each other. The outer ends of the members 7ª are bent to form hooks or eyes 8ª to which other links of a side member of a chain may be connected.

In placing a chain containing my links around a tire, I prefer to put the side members under such tension that the members 7 of my link and the spring will be extended as much as possible, though the tension could be reduced or even be as is usual on antiskid chains without departing from my invention. With tension on the springs, I find that the chains creep around the tire so as to evenly distribute the wear on the latter, while the chain is kept closely to the tire without rattling or liability of coming off or unhooking, if hooks are used.

I claim—

1. In a tensioning device for an antiskid chain for automobile tires, a link comprising two members each having at opposite ends an eye and a loop connected by a neck which forms a shoulder at its junction with the loop, the loops being interlinked and the members of the loop being twisted around each other, in combination with a coiled spring surrounding the interlinked loops and having its ends contracted about the necks of the said members and engaging the said shoulders which serve as stops for the ends of the spring.

2. In a tensioning device for an antiskid chain for automobile tires, a link comprising two members each having at opposite ends a side-member connecting means and a loop, the loops being interconnected and both sides of the loops being continued through the necks and the side-member connecting means and the continuations of the loops being twisted together at their necks, in combination with a coiled spring surrounding the interlinked loops and having its ends contracted about the necks of the said members and engaging the said shoulders which serve as stops for the ends of the spring.

In testimony whereof I have hereunto set my hand this 19th day of July, A. D. 1922.

FRED WIKE.